United States Patent [19]
Höglund et al.

[11] Patent Number: 5,615,997
[45] Date of Patent: Apr. 1, 1997

[54] PUMP FOR PUMPING FIBROUS PULP SUSPENSION

[75] Inventors: Ronny Höglund, Skoghall; Ulf Jansson, Karlstad, both of Sweden

[73] Assignee: Kvaerner Pulping Technologies Aktiebolag, Sweden

[21] Appl. No.: 560,975

[22] Filed: Nov. 20, 1995

[30] Foreign Application Priority Data

Sep. 7, 1995 [SE] Sweden .................................. 9503072

[51] Int. Cl.[6] ...................................................... F04D 29/22
[52] U.S. Cl. .......................... 415/169.1; 416/181; 416/188
[58] Field of Search .................................. 415/143, 169.1; 416/181, 183, 188, 223 B, 186 R

[56] References Cited

U.S. PATENT DOCUMENTS

| | | | |
|---|---|---|---|
| 5,039,320 | 8/1991 | Hoglund et al. | 415/143 |
| 5,209,641 | 5/1993 | Hoglund et al. | 415/169.1 |
| 5,387,087 | 2/1995 | Chen | 416/188 |

FOREIGN PATENT DOCUMENTS 607157  12/1934  Germany .................................. 416/181

*Primary Examiner*—James Larson
*Attorney, Agent, or Firm*—Ronald P. Kananen

[57] ABSTRACT

The invention relates to a pump for pumping fibrous pulp suspension and separating gas from the suspension, comprising a pump casing with a pump casing chamber (4) with an axial inlet (17) and a radial outlet (6) for the suspension and also a gas outlet (19); in the pump chamber part a pump wheel (3) with a hub (27), on the hub front pump vanes (30) in a front pump chamber part (4A) facing the inlet, rear pump vanes (32) in a rear pump chamber part (4B) and an annular partition (28) between the front and rear pump chamber parts, which partition is joined to the hub; and a drive shaft (10) for the pump wheel which extends through one end wall (7) of the pump casing, and also bearing members (13, 14, 15) for the drive shaft. What is characteristic of the invention is that the hub has an outer portion (36) which extends mainly radially outwards in the rear pump chamber part, that the annular partition is arranged a little in front of the outer hub portion, that the inner diameter of the partition is smaller than the outer diameter of the outer hub portion so that the radial extents of the partition and the outer hub portion at least partly overlap one another in the radial direction, and that channels (50) extend with a portion mainly radially between the rear side (42) of the partition (28) and the front side (37) of the outer hub portion (36) from the inner part of the front pump chamber part (4A) towards the outer part of the rear pump chamber part (4B).

14 Claims, 4 Drawing Sheets

PUMP FOR PUMPING FIBROUS PULP SUSPENSION

TECHNICAL FIELD

The invention relates to a pump for fibrous pulp suspension with means for separating gas from the suspension, comprising a pump casing with a pump chamber with an axial inlet and a radial outlet for the suspension and also a gas outlet; in the pump chamber a pump wheel with a hub, on the hub front pump vanes in a front pump chamber part facing the inlet, rear pump vanes in a rear pump chamber part and an annular partition between the front and rear pump chamber parts, which partition is joined to the hub; and a drive shaft for the pump wheel which extends through one end wall of the pump casing, and also bearing members for the drive shaft. In particular, the invention relates to an improved so-called MC pump, i.e. a pump for pumping pulp suspensions with relatively high pulp concentration, e.g. 8–15%, which cannot be pumped with conventional radial pumps.

BACKGROUND OF THE INVENTION

A pump of the abovementioned type is known from SE-B-467 466 (corresponding to U.S. Pat. No. 5,039,320). In this pump, there are openings between the hub and the annular partition, through which the fibrous pulp suspension and the air or gas which is to be separated can pass from the front to the rear pump chamber part in a radial/axial direction, in which the axial movement component is considerable. This has the consequence that considerable axial forces arise in the pump casing, acting on the pump wheel, which in turn makes the mounting of the drive shaft of the pump wheel more difficult and calls for the use of special bearings. Another consequence is that the gas/air separated in the axial direction will contain an undesirable content of fibrous pulp.

BRIEF DESCRIPTION OF THE INVENTION

The aim of the invention is to solve the abovementioned problem by offering an improved pump wheel of the type indicated in the introduction. Characteristic in this connection is that the hub has an outer portion which extends mainly radially outwards in the rear pump chamber part, that the annular partition is arranged at a distance from and in front of the outer hub portion, that the inner diameter of the partition is smaller than the outer diameter of the outer hub portion so that the radial extents of the partition and the outer hub portion partly overlap one another in the radial direction, and that channels extend with a portion mainly radially between the rear side of the partition, the front side of the outer hub portion and the rear pump vanes from the inner part of the front pump chamber part towards the outer part of the rear pump chamber part.

In a preferred embodiment, the hub comprises in front of the outer portion a front portion with a diameter increasing in the direction of the section of the hub which comprises the outer portion, which section preferably constitutes a rear section of the hub. Further characteristics and aspects of the invention emerge from the following patent claims and from the following description of a preferred embodiment.

BRIEF DESCRIPTION OF THE FIGURES

In the following description of a preferred embodiment, reference will be made to the attached drawing figures, in which.

DETAILED DESCRIPTION OF AN EMBODIMENT

Figure 1:
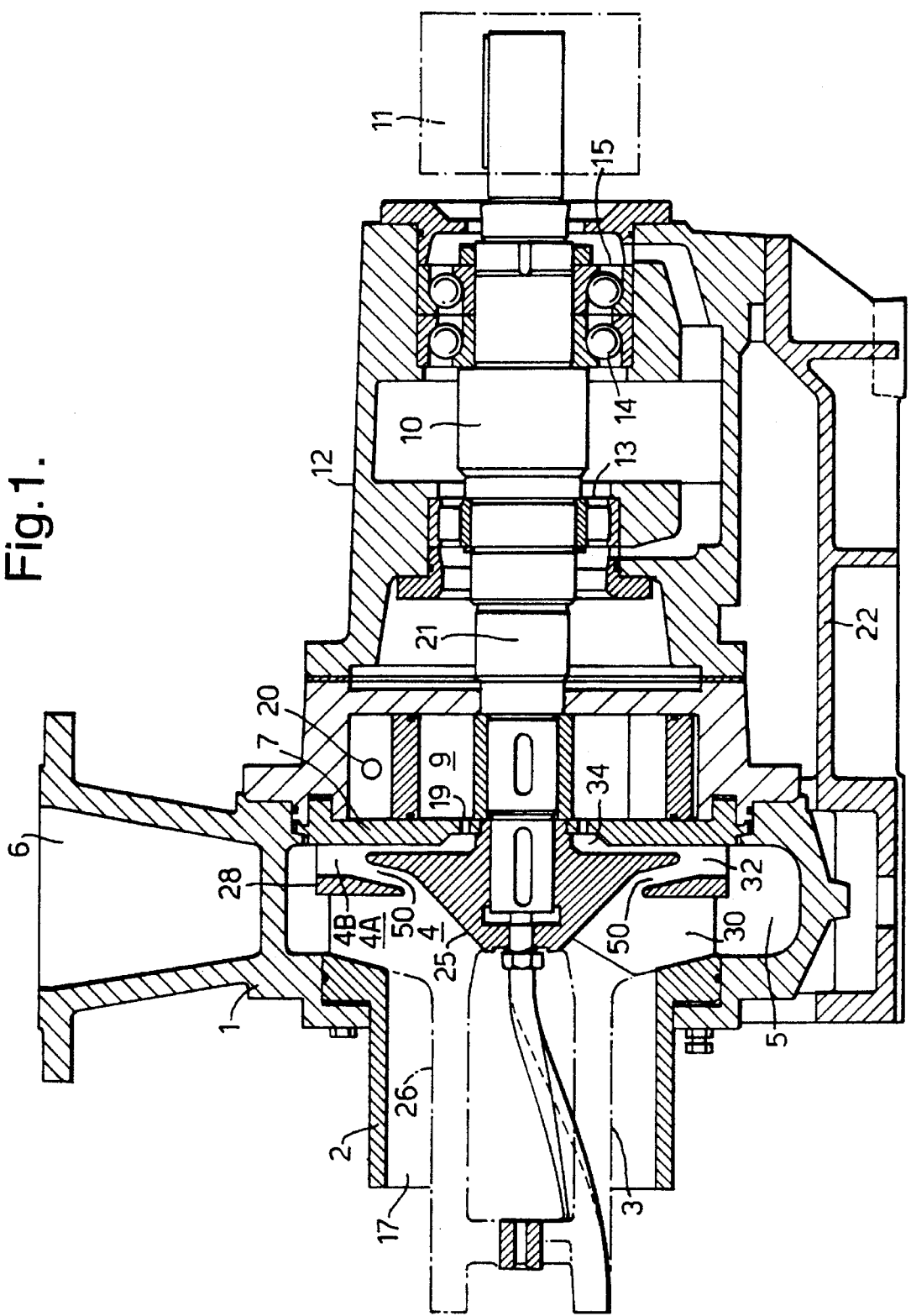
FIG. 1 shows a pump according to the invention in axial section, details which are non-essential for the invention having been omitted.
Figure 2:
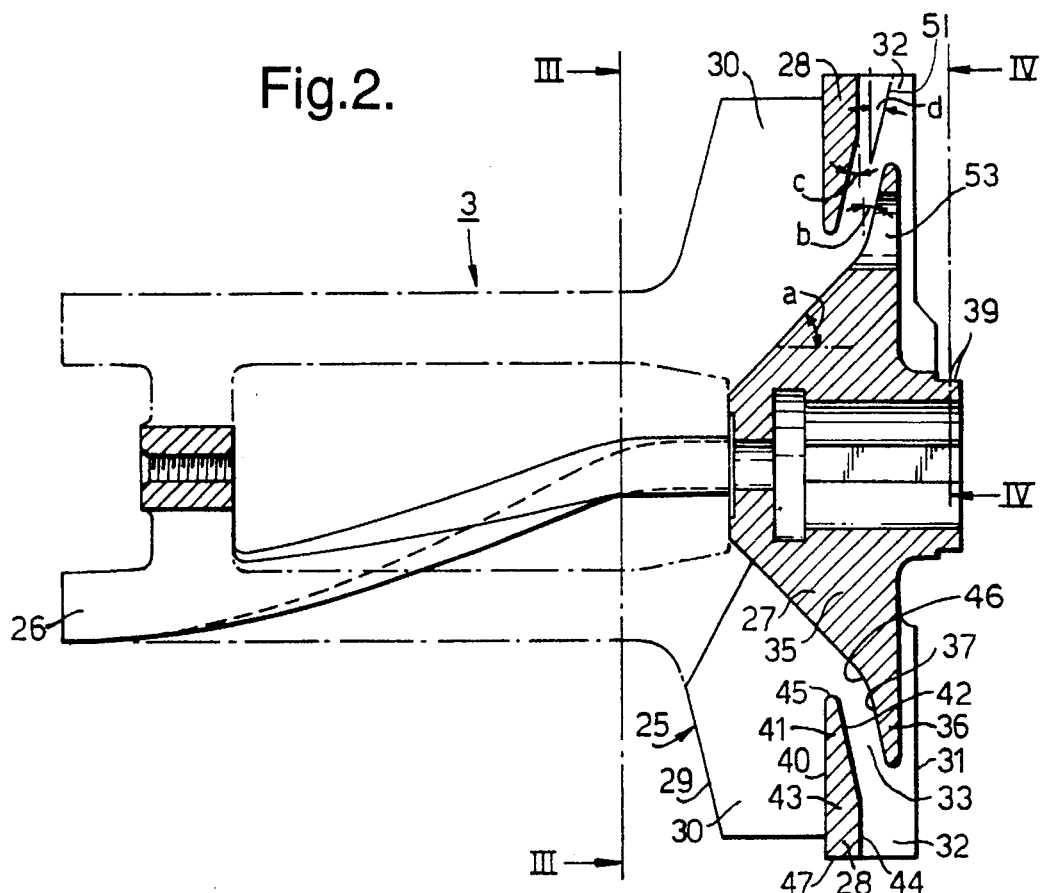
FIG. 2 shows an impeller in axial section, which forms part of the pump.
Figure 3:
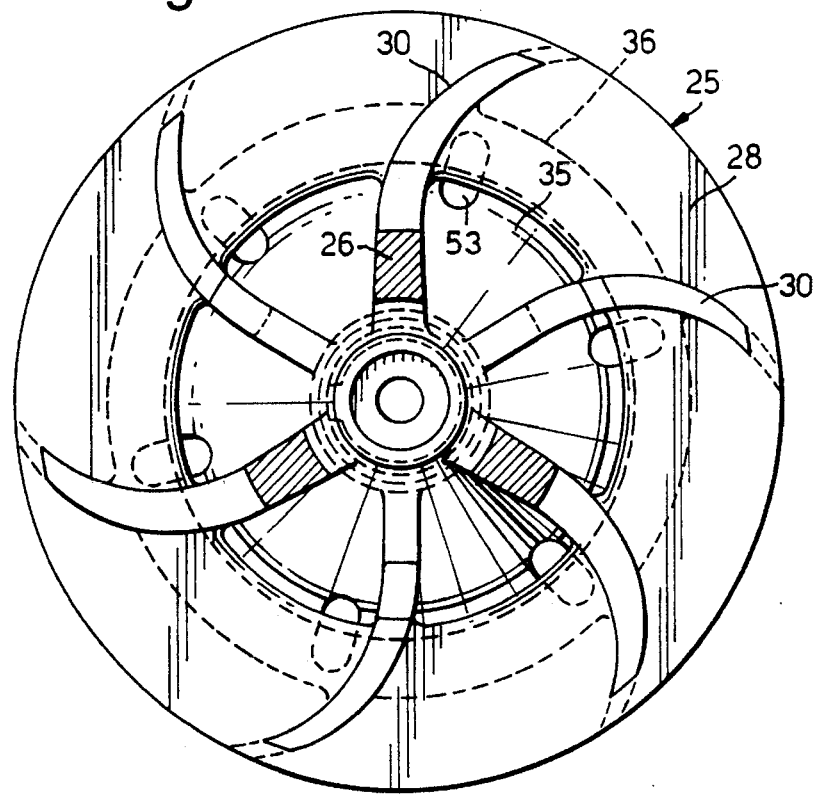
FIG. 3 shows the impeller in a view along III—III in FIG. 2.
Figure 4:
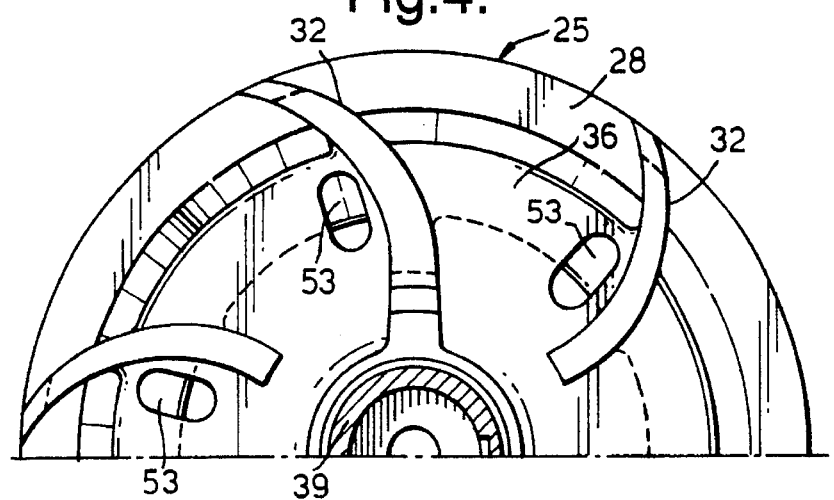
FIG. 4 shows the impeller in a view along IV—IV in FIG. 2.

The main parts of the pump, FIG. 1, consist of a pump casing 1, the inlet part of which is constituted by a sleeve 2; an impeller 3; a pump chamber 4 which merges with a radial outlet 6 via a worm 5; an end wall 7 which delimits the pump chamber 4 from a rotor unit 8 which includes a vacuum pump generally designated by 9; a drive shaft 10 for the impeller 3 and for the vacuum pump 9; a drive motor symbolically shown by 11 for the shaft 10 which extends through the end wall 7; and a bearing unit 12 with a roller bearing 13 and ball bearings 14, 15 for the drive shaft 10.

In the inlet part 2, there is a cylindrical inlet 17 for the pulp suspension which is to be pumped and which contains a certain amount of gas, normally mainly air. Between the pump chamber 4 and the vacuum pump 9, there is one or more passages 19 for the gas/air and an outlet, symbolically shown by the number 20, for the separated gas/air.

The pump is normally mounted with the axis of rotation 21 horizontal. A stand has been designated by 22. Other details which do not affect the invention have not been shown in the drawing figures. The pump chamber 4 can be divided into a front pump chamber part 4A and a rear part 4B. Towards the front, the pump chamber 4 is delimited by the inlet part 2 and towards the rear it is delimited by the end wall 7 and towards the outside by the worm 5.

What is particularly characteristic of the invention is the design of the impeller 3, more specifically the design of a pump wheel 25 which is included as an integral part of the impeller and which will be described in detail with reference to FIGS. 2–6.

The impeller 3 consists of the pump wheel 25 in the pump chamber 4 and a fluidizing rotor 26 in the inlet part 2, and is constituted by a cast-integral unit. According to the invention, the fluidizing rotor 26 is of the same type as according to the abovementioned SE 467 466/U.S. Pat. No. 5,039,320, and will therefore not be described in greater detail here but reference should instead be made to the said patent specifications.

The pump wheel 25, similarly to the corresponding pump wheel described in SE 467 466/U.S. Pat. No. 5,039,320, is of the radial wheel type and includes a hub 27, a partition 28 between the front and rear pump chamber parts 4A and 4B and a number of front vanes 30 facing towards the inlet part 2 with their side edges 29 and a number of rear vanes 32 facing towards the end wall 7 with their side edges 31, which front and rear vanes 30, 32 are rigidly connected to the partition 28 and run into the front pump chamber part 4A and into the rear pump chamber part 4B respectively. The vanes 30, 32 are in a manner known per se curved backwards towards the direction of rotation of the pump wheel 25 as can be seen from FIGS. 3–6. According to the embodiment, the front vanes 30 have a greater axial extent than the rear vanes 32 and define essentially the capacity of the pump. On the other hand, the rear vanes 32 have in a manner known per se a greater radial extent in order to produce the desired pressure according to principles which are known per se as far as so-called MC pumps are concerned. The front vanes 30 almost bear with their front edges 29 against the inlet part 2 and the rear vanes 32 almost bear with their edges 31 against the end wall 7, which contributes to giving the pump the desired high efficiency. The respective front and rear vanes 30, 32 in each vane pair lie in a manner known per se in a coincident curved plane, parallel with the axis of rotation, and every other of the front vanes constitutes an integral extension of the rotor blades lying in front. A transition piece between the front and rear vanes has been designated as 33.

The hub 27 consists of a front conical portion 35 and a rear collar-shaped portion 36. The front conical portion 35 constitutes the main part of the hub 27 and more specifically has the shape of a right-truncated cone with a 90° cone apex angle, which means that the generatrix of the cone is inclined at an average angle a=45° in relation to the axis of rotation 21. The average angle of inclination a is preferably between 30° and 60°, more preferably between 35° and 55°, and most preferably between 40° and 59°. The collar-shaped portion 36 also has the shape of a right-truncated cone with the apex directed forwards, but the cone apex angle is much greater than the cone angle on the front portion 35; 150° according to the illustrated embodiment which means that the front side 37 of the collar-shaped portion 36, or more specifically its generatrix, forms an angle b=15° in relation to a radial plane at right angles to the axis of rotation 21. The angle b is preferably between 5° and 30°, more preferably at most 20°, and most preferably between 8° and 17°. The front side of the collar-shaped portion 36 has an average angle of inclination in relation to the axis of rotation which is preferably between 70° and 90°, more preferably between 65° and 85°, and most preferably between 70° and 80°. According to the preferred embodiment, the front portion 35 has a considerably greater axial length than the collar-shaped portion 36, preferably 2–5 times as long. In the illustrated embodiment, the collar-shaped portion 36 has an axial extent which corresponds to only approximately a third of the axial extent of the front conical portion 35 of the hub. The hub 27 is terminated with a cylindrical portion 39 which extends forwards towards and into the through-opening in the end wall 7. Half of the rear vanes 32 are joined with their inner ends to the cylindrical portion 39. Between the other rear vanes 32 and the cylindrical portion, there is a gap 34, FIG. 1.

According to the invention, the partition 28, which constitutes the partition between the front and rear parts 4A and 4B of the pump chamber 4, is annular and has a plane front side 40. More specifically, it consists of an inner part 41 with a conical inclined rear side 42 and an outer part 43 with a plane rear side 44. The inner part 41 extends from an inner circumferential edge 45 in front of the collar-shaped portion 36 of the hub and slightly outside the transition 46 between the front part 35 of the hub and the collar-shaped portion 36 out to the outer circumferential edge 47 of the partition 28, which also lies in front of the collar-shaped portion 36 and outside this. The angle of inclination of the rear wall 42 in relation to the radial plane is c=12° according to the embodiment.

In this text, the front vanes 30 are defined as those parts of the joined vanes 30/32 which extend from the front edge 29 to the radial plane which coincides with the plane front side 40 of the partition 28. The rear vanes 32 are defined as those parts of the joined vanes 30/32 which extend from the radial plane which coincides with the plane rear side 44 of the partition to the rear vane edge 31, and the transition portion 33 between the front and rear vanes is defined as the area which in the axial direction is delimited by the hub 27 and the inside of the partition 28 and by the two radial planes which coincide with the plane sides 40, 44 of the partition.

Figure 5:
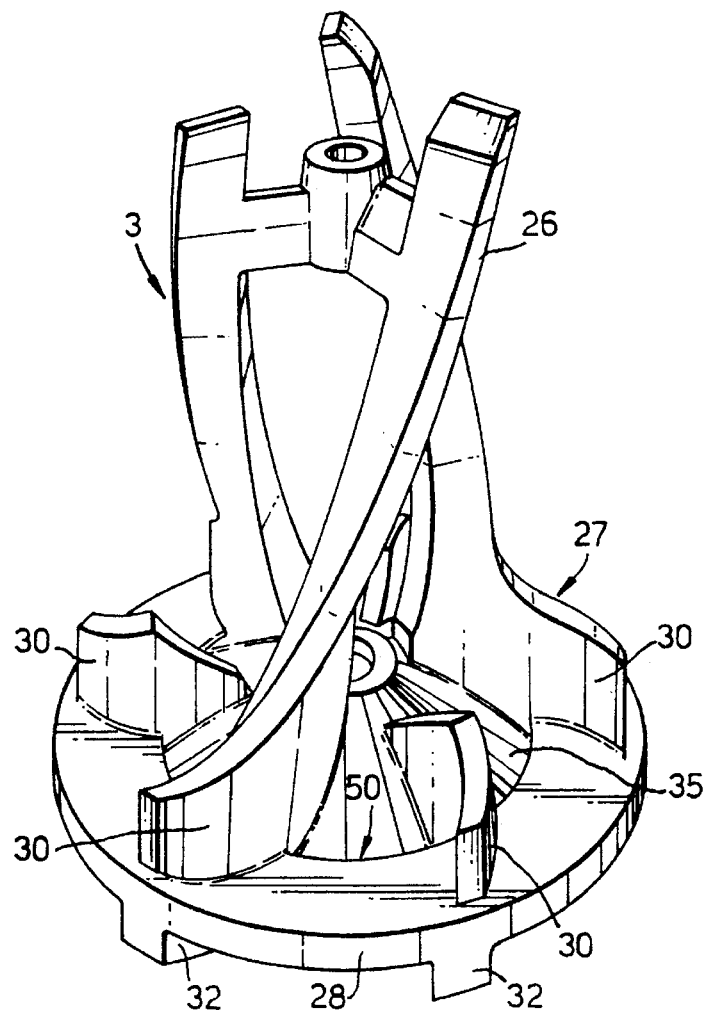
FIG. 5 shows the impeller in a perspective view obliquely from the front.
Figure 6:
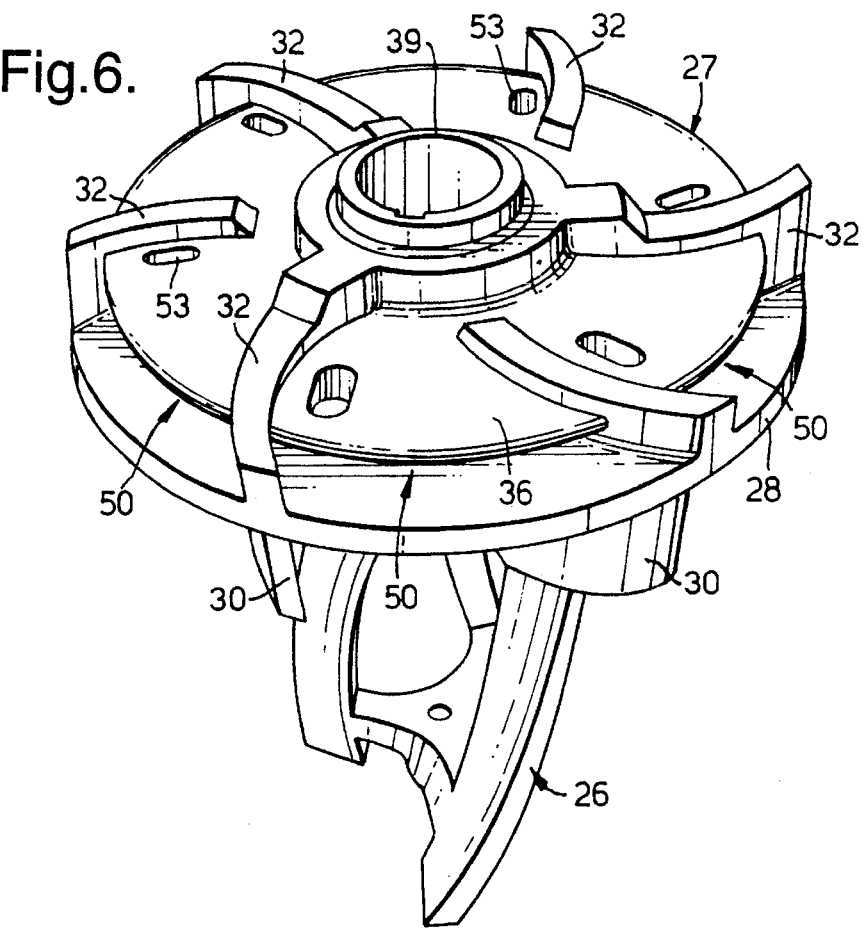
FIG. 6 shows the impeller in a perspective view obliquely from the rear.
Figure 7:
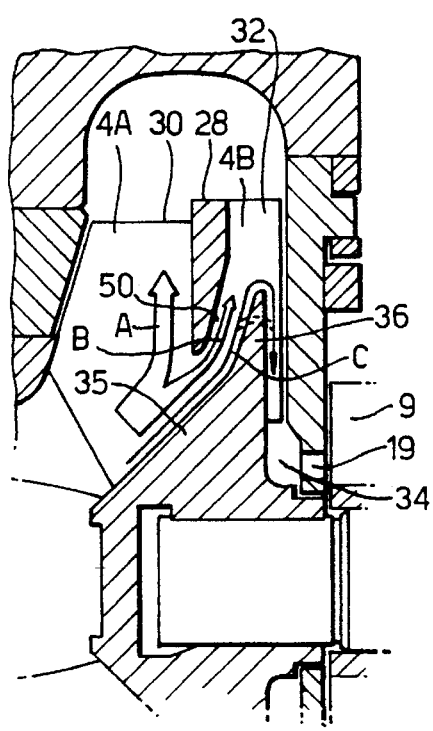
FIG. 7 illustrates the main flow paths for the pulp suspension and for the separated gas/air in the pump chamber.

The collar-shaped portion 36 of the hub can thus be described as in an axial section having the shape of an outwardly narrowing wedge, while the inner part 41 of the partition 28 can correspondingly be said to have the shape of an inwardly narrowing wedge. These wedge-shaped portions—the flange-shaped portion 36 and the inner part 41 of the partition 28—are furthermore orientated in such a manner that they mostly overlap one another in the radial direction. As a result, a number of channels 50, FIG. 1, FIG. 5, FIG. 6, are formed between the front pump chamber part 4A and the rear pump chamber part 5B, which channels 50 extend in the main in the radial direction from the inner part of the front pump chamber part 4A towards the outer part of the rear pump chamber part 4B. These channels 50 widen outwards slightly and are delimited at the front by the sloping wall 42 on the partition 28 and at the rear by the sloping wall 37 on the collar-shaped portion 36 of the hub and adjacent channels 50 are delimited from one another by the transition portions 33 between the front and rear vanes 30, 32 and by the delimiting portions of the front and rear vanes 30, 32 respectively. The average angle of inclination d of these channels 50, that is to say the angle of inclination of the centre line 51 of the channels, in relation to the radial plane is 13.5° according to the embodiment.

The hub 27 is furthermore provided with a number of holes 53 which pass through in the axial direction—according to the embodiment six; as many as the number of front and rear pump vanes 30, 32—holes 53 which are oval in the radial direction. The holes 53 are oval and have in the radial direction an extension from a point slightly inside the transition 46 between the front conical portion 27 and the collar-shaped portion 36 of the hub and as far as slightly inside the all-round circumferential line of the collar-shaped portion and are positioned behind the rear pump vanes 32 seen in the direction of rotation of the pump wheel.

The pump described thus is intended to pump fibrous suspensions of average fibre concentration, normally approximately 8–10%, which cannot be pumped with conventional pumps. In order that the suspension flowing in through the inlet 17 is pumpable, it must first be fluidized which takes place in a manner known per se with the aid of the rotor 26. With the aid of the pump vanes 30, 32 on the rotating pump wheel 25, the fluidizing suspension is thrown out into the worm 5 and further out through the radial outlet 6. The main flow A is driven out through the front pump chamber part 4A by the front pump vanes 30 and the part flow B flows through the channels 50 out into the outer part of the rear pump chamber part 4B where the rear pump vanes 32 generate the desired pump pressure. The direction of flow of the pulp suspension, seen in axial section through the pump, therefore becomes quite predominantly radial, while the axial movement component becomes relatively small in the area of the pump chamber 4. The force exerted in the axial direction by the suspension on the pump wheel 3 becomes correspondingly small which in turn means relatively small stresses in the axial direction on the axial bearings. The ball bearings 14, 15 can therefore consist of e.g. angular-contact bearings which allow very small axial and radial play which is a considerable advantage from the constructional point of view. The invention is of course not restricted to the use of such bearings but it is an advantage that the invention gives the designer a freer hand in the selection of bearings than e.g. in the case of the pump which is described in SE 467 466/U.S. Pat. No. 5,039,320. The through-holes 53 in the partition 28 behind the pump vanes also contribute to the axial balancing of the pump wheel 25. On the rear side of the hub 27, behind the rear pump vanes 32, there is formed, in the absence of the holes 53, an under-pressure which is relieved by the holes 53. As a result of the design of the pump wheel 25, very good separation is also achieved of the air, steam or other gas which there is in the suspension. This gas is separated and is accumulated preferably in the centre in front of the pump wheel 25, from where it, shown by C, flows along the front conical part 35 of the hub, further through the channels 50 until the front surface 37 on the collar-shaped portion 36, around this portion and inwards between the rear side of the collar-shaped portion 36 and the end wall 7 towards the cylindrical part 39 of the hub, from where the gas is sucked in through the opening(s) 19 in the end wall 7 by the vacuum pump 9 in order finally to be driven out through the blow-out opening 20. Some gas also flows through the openings 53 in the collar-shaped portion 36 to join with the gas which passes around the outer circumferential edge of the collar-shaped portion.

We claim:

1. A pump for pumping fibrous pulp suspension and separating gas from the suspension, comprising;

a pump casing having a pump casing chamber (4) with an axial inlet (17) and a radial outlet (6) for the suspension and also a gas outlet (19);

in the pump chamber a pump wheel (3) with a hub (27), on the hub front pump vanes (30) in a front pump chamber part (4A) facing the inlet, rear pump vanes (32) in a rear pump chamber part (4B) and an annular partition (28) between the front and rear pump chamber parts, which partition is joined to the hub; and a drive shaft (10) for the pump wheel which extends through one end wall (7) of the pump casing, and also bearing members (13, 14, 15) for the drive shaft;

wherein the hub has an outer portion (36) which extends mainly radially outwards in the rear pump chamber part, the annular partition is arranged at a distance from and in front of said outer hub portion, the inner diameter of the partition is smaller than the outer diameter of the outer hub portion so that the radial extents of the partition and the outer hub portion at least partly overlap one another in the radial direction, and channels (50) extend with a portion mainly radially between the rear side (42) of the partition (28) and the front side (37) on the outer hub portion (36) from the inner part of the front pump chamber part (4A) towards the outer part of the rear pump chamber part (4B).

2. The pump according to claim 1, wherein adjacent channels (50) are delimited from one another by one of said front and rear pump vanes and by transition portions (54) between said front and rear pump vanes.

3. The pump according to claim 1, wherein the hub comprises in front of the outer portion (36) a front portion (35) with a diameter increasing in the direction of the outer portion.

4. The pump according to claim 1, wherein the outer portion is constituted by a mainly radially extending collar-shaped portion.

5. The pump according to claim 3, wherein the average angle of inclination between a generatrix of the front portion and an axis of rotation (21) is less than the corresponding average angle of inclination of the front side of the outer portion.

6. The pump according to claim 5, wherein the front portion (35) has a greater axial length than the outer portion (36).

7. The pump according to claim 5, wherein the front portion has an average angle of inclination in relation to the axis of rotation which is between 30° and 60°, and the front side of the outer portion has an average angle of inclination in relation to the axis of rotation which is between 70° and 90°.

8. The pump according to claim 7, wherein the average angle of inclination in relation to the radial plane is between 5° and 30°.

9. The pump according to claim 1, wherein said outer portion on the hub is provided with through-holes (53) behind the pump vanes seen in the direction of rotation of the pump wheel.

10. The pump according to claim 6, wherein the axial length of the front portion is 2–5 times as long as the outer portion.

11. The pump according to claim 7, wherein the average angle of inclination of the front portion in relation to the axis of rotation is between 35° and 55°, and the average angle of inclination of the front side of the outer portion in relation to the axis of rotation is between 65° and 85°.

12. The pump according to claim 7, wherein the average angle of inclination of the front portion in relation to the axis of rotation is between 40° and 59°, and the average angle of inclination of the front side of the outer portion in relation to the axis of rotation is between 70° and 80°.

13. The pump according to claim 8, wherein the average angle of inclination in relation to the radial plane is at most 20°.

14. The pump according to claim 8, wherein the average angle of inclination in relation to the radial plane is between 8° and 17°.

* * * * *